(12) United States Patent
Felix

(10) Patent No.: US 9,013,300 B2
(45) Date of Patent: Apr. 21, 2015

(54) METHOD OF COMMUNICATING INFORMATION THROUGH A WEARABLE DEVICE

(71) Applicant: Wilfredo Felix, Bronx, NY (US)

(72) Inventor: Wilfredo Felix, Bronx, NY (US)

(*) Notice: Subject to any disclaimer, the term of this patent is extended or adjusted under 35 U.S.C. 154(b) by 0 days.

(21) Appl. No.: 14/289,899

(22) Filed: May 29, 2014

(65) Prior Publication Data

US 2014/0368336 A1    Dec. 18, 2014

Related U.S. Application Data

(60) Provisional application No. 61/834,130, filed on Jun. 12, 2013.

(51) Int. Cl.

| | |
|---|---|
| *G08B 1/08* | (2006.01) |
| *H04W 4/00* | (2009.01) |
| *G08B 21/02* | (2006.01) |
| *G07C 9/00* | (2006.01) |
| *G06Q 20/32* | (2012.01) |
| *H04W 4/22* | (2009.01) |
| *H04M 1/00* | (2006.01) |
| *H04W 4/02* | (2009.01) |
| *H04L 29/08* | (2006.01) |

(52) U.S. Cl.
CPC ............ *H04W 4/008* (2013.01); *G08B 21/02* (2013.01); *G07C 9/00007* (2013.01); *G06Q 20/327* (2013.01); *H04W 4/006* (2013.01); *H04W 4/025* (2013.01); *H04W 4/22* (2013.01); *H04L 67/306* (2013.01); *H04M 1/00* (2013.01)

(58) Field of Classification Search
CPC ..... H04L 9/3231; H04L 67/22; H04L 9/3213; H04M 2250/12; A61B 5/00
USPC ................ 340/539.12, 539.13, 539.11, 5.61, 340/573.1; 715/864; 713/186; 455/41.2
See application file for complete search history.

(56) References Cited

U.S. PATENT DOCUMENTS

| | | | | |
|---|---|---|---|---|
| 2008/0238610 | A1* | 10/2008 | Rosenberg | ..................... 340/5.7 |
| 2010/0161434 | A1* | 6/2010 | Herwig et al. | .................. 705/20 |
| 2013/0021154 | A1* | 1/2013 | Solomon et al. | ......... 340/539.12 |
| 2013/0198694 | A1* | 8/2013 | Rahman et al. | ............... 715/864 |
| 2014/0045547 | A1* | 2/2014 | Singamsetty et al. | ..... 455/552.1 |
| 2014/0089672 | A1* | 3/2014 | Luna et al. | ..................... 713/186 |
| 2014/0220887 | A1* | 8/2014 | Yang et al. | ................... 455/41.1 |

* cited by examiner

*Primary Examiner* — Toan N Pham

(57) ABSTRACT

A method of communicating information through a wearable device is provided as a means of receiving, storing, and transmitting information to a plurality of nearby compatible devices and systems in order to facilitate a plurality of data transfer dependent tasks. The wearable device uses several electronic components in order to receive information from various sources, store the information for later use, identify nearby compatible devices and systems, and quickly communicate information to the nearby compatible devices and systems. The wearable device accomplishes this with minimal additional interactions from the user. Through the method of use, the wearable device can be used for keyless entry systems, passively transferring settings to various devices, transmitting secure identify information upon request, and transmitting secure financial information. The method also provides a means of detecting and requesting assistance when a user is in an emergency.

15 Claims, 13 Drawing Sheets

Receiving a Plurality of Sensor Data as Proximity Scanning Information from the Compatible Device Proximity Sensor Monitoring the Proximity Scanning Information with the Processor for a Compatible Device or System Identification Signal Detecting a Nearby Compatible Device or System as an Identification Reader through the Compatible Device or System Identification Signal Receiving a Request for the Secure Identification Data from the Identification Reader through the Proximity Communications Unit Verifying the Identification Reader and the Request for the Secure Identification Data Transmitting the Secure Identification Data to the Identification Reader through the Proximity Communications Unit

FIG. 9

METHOD OF COMMUNICATING INFORMATION THROUGH A WEARABLE DEVICE

The current application claims a priority to the U.S. Provisional Patent application Ser. No. 61/834,130 filed on Jun. 12, 2013.

FIELD OF THE INVENTION

The present invention relates generally to a method of communicating information, more specifically, to a method of receiving, storing, monitoring, and transmitting information through a wearable device allowing a plurality of interaction with compatible devices and systems.

BACKGROUND OF THE INVENTION

In the modern world the information flows constantly between individuals, companies, organizations, and governments. Information can be defined as knowledge which is derived from study, experience; information can also be defined as a collection of facts or observations. There are many different reasons why information is exchanged, however perhaps the simplest and most common reason for information exchange is the sharing of knowledge. For example, in the science community, new discoveries are often shared with others in the same fields as the original discovers. This sharing opens up new avenues for a discovery to be further analyzed, criticized, and refined by others who have something to add to the information. Thus, information can be expanded and improved through sharing. In other cases information may be exchanged in an attempt to gain an advantage over competing or opposing entities. For example, marketing companies may sell information about potential customers to companies, thus granting companies the ability to further target and refine their products in an attempt to sell more products by appealing to the behavior and personality of their customers. Another good example of the value of information can be seen in military applications. Covertly obtaining information about an opposing force can grant various different advantages. For example an army which knows more about the composition and deployment of an opposing army can react accordingly, and thus drastically increase their chances of winning any subsequent engagements. Any information obtained by a scout must be exchanged with a command facility where commanding officers can analyze the information and transmit appropriate orders to their forces.

Of course, there are many other reasons for obtaining and exchanging information which do not revolve around the neutralization of a hostile enemy force. Perhaps one of the most common reasons for exchanging information in the modern world is to express personal ideas and opinions. This has resulted in the creation and refinement of a massive social network in which nearly every word and picture by a single user can be accessed and commented on by all other users in the network. Current social networks are driven primarily by connection to the internet. The internet is a massive network of computer networks which all communicate using standard information exchange protocols. The internet allows for rapid exchange of digitized information and is capable of exchanging text, voice, pictures, and videos between users.

Access to the internet has increased drastically over recent years, with nearly every modern mobile communications device available to the public being capable of accessing the internet via telecommunications towers. Additionally most mobile communications devices are also capable of connecting to wireless networks which cover small areas and offer fast connection to the internet by virtue of a wireless router. Resultantly, the internet is inarguably one of the most, if not the most significant vehicle for information exchange in the modern world. Despite the massive, advanced, and rapid information exchange potentials of the internet, people still exchange information through more conventional means such as through vocal and written communication. Vocal and written communication is often used as initial exchanges of contact information between individuals. For example, two businessmen may exchange business cards on which their respective contact information is printed. This allows the two businessmen to further communicate with one another remotely such as via email or telecommunications. This is a rather primitive method of exchanging information when compared to modern methods like the internet, and there are a number of disadvantages involved. For example, the information printed on the business card must eventually be entered into a digital contacts list such that it may be stored for later use. It is possible to lose the business card before the information is input into a digital format. With voice communication, the information is often stored within the mind of the person receiving the information, and thus it is even easier to lose the information before it is stored digitally as the person may simply forget what they were trying to remember. It is clear that there is a need for a better way to initially exchange information between individuals such that digital information exchange can proceed between them at a later date.

SUMMARY OF THE INVENTION

In response to the issues stated above, it is an object of the present invention to create an apparatus which is capable of exchanging information within close proximity. It is a further object of the present invention to be wearable such that a user may wear it on their wrist, ear, or some other body part. The purpose of the apparatus is to exchange information from one user wearing the apparatus to another user who is wearing another of the apparatus. This exchange of information may be triggered in a variety of ways including by proximity, by manual activation, or by motion activation. It is a further object of the present invention to allow the user to determine what information is stored on the wristband or device, and what of that information is exchangeable with others. This allows the user to utilize the present invention as digital storage as well as for the express purpose of exchanging information with other individuals.

It is also the further purpose of the invention to personally identify the user for access to user data or information on information systems. Where the user may obtain access to certain levels of information based upon user security level and allowable security. Another purpose of the invention is to store user data with the purpose to store personally identifiable information, (i.e. medical records, physical data, banking information, passport information), as sort of a universal passport giving access to different systems that the user may have association with. Another purpose of the invention is to provide levels of access to physical systems in place of a key, such that to contain biometric key data which allows user to communicate with the incorporated system, such as to get access to these systems and communicate with them to allow access such as in the case to act as a wearable key. To open house doors, to start the car and set the user's preferences as these systems will communicate with one another, identify the user and level of access, also as a method of payment, for storage of user data to act as a form of payment. This will allow the user to make purchases as the systems would recognize the user and payment form. This would allow easier access to speed pay for products and services. The wearable device would also interact with products where the user would virtual total all items for purchase and communicate with the systems to allow for fast pay, thereby eliminating lines and waiting for services. Making these processes faster, more convenient, and pleasurable. Another purpose is for social media and gaming interactions with systems so that user is personally identifiable so that they may gain access to their user data even when not based on home systems. A user therefore can bring their my playstation, Xbox, etc user data to another location, (i.e. to a friend's home.)

BRIEF DESCRIPTIONS OF THE DRAWINGS

FIG. 9 is a flow chart diagram displaying the process of transmitting secure identification data to an identification reader as per the current embodiment of the present invention.

DETAIL DESCRIPTIONS OF THE INVENTION

All illustrations of the drawings are for the purpose of describing selected versions of the present invention and are not intended to limit the scope of the present invention.

Figure 1:
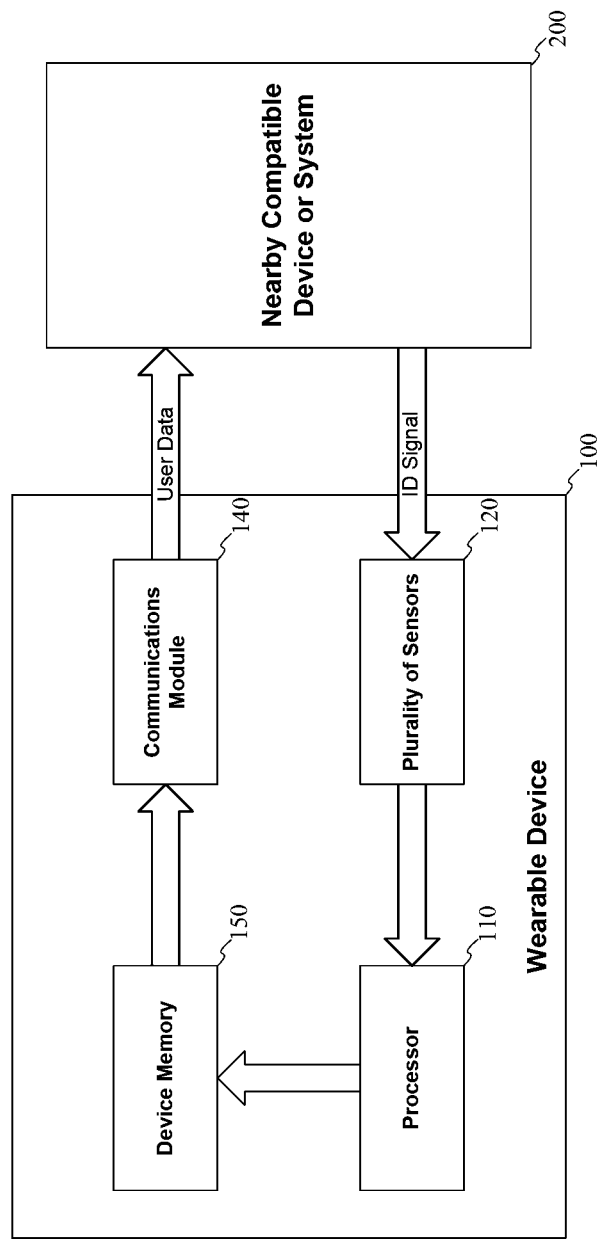
FIG. 1 is a block diagram displaying the general interaction of the current embodiment of the present invention.
Figure 2:
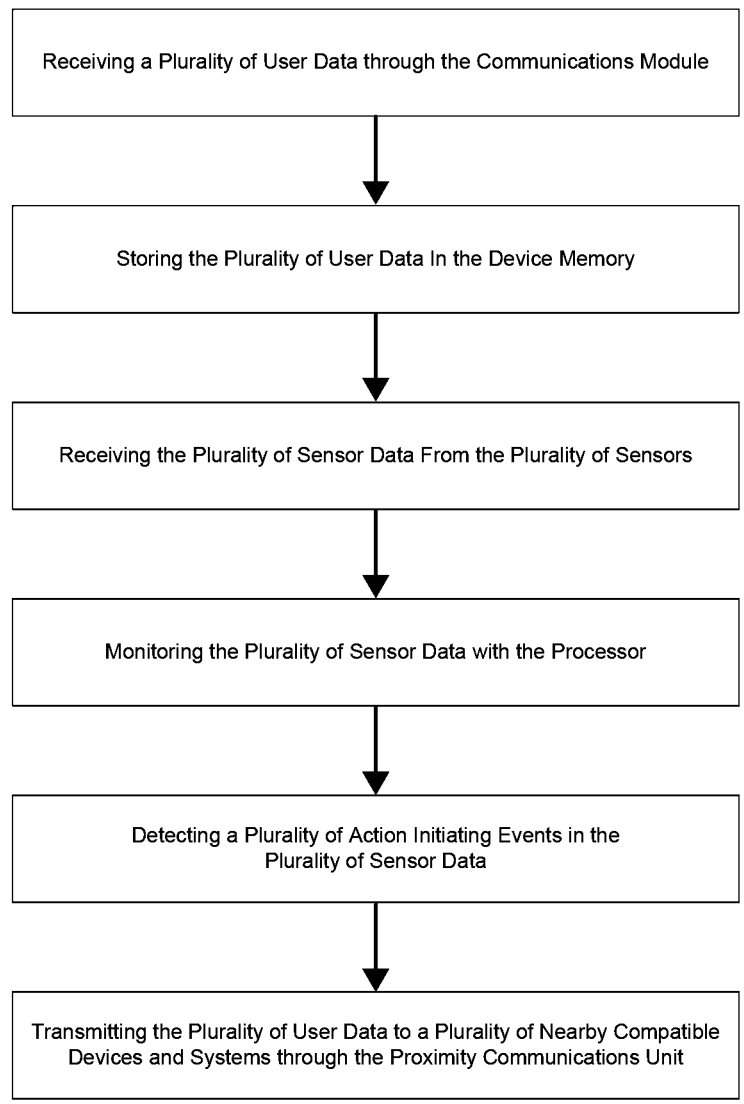
FIG. 2 is a flow chart displaying the general process overview of the current embodiment of the present invention.
Figure 3:
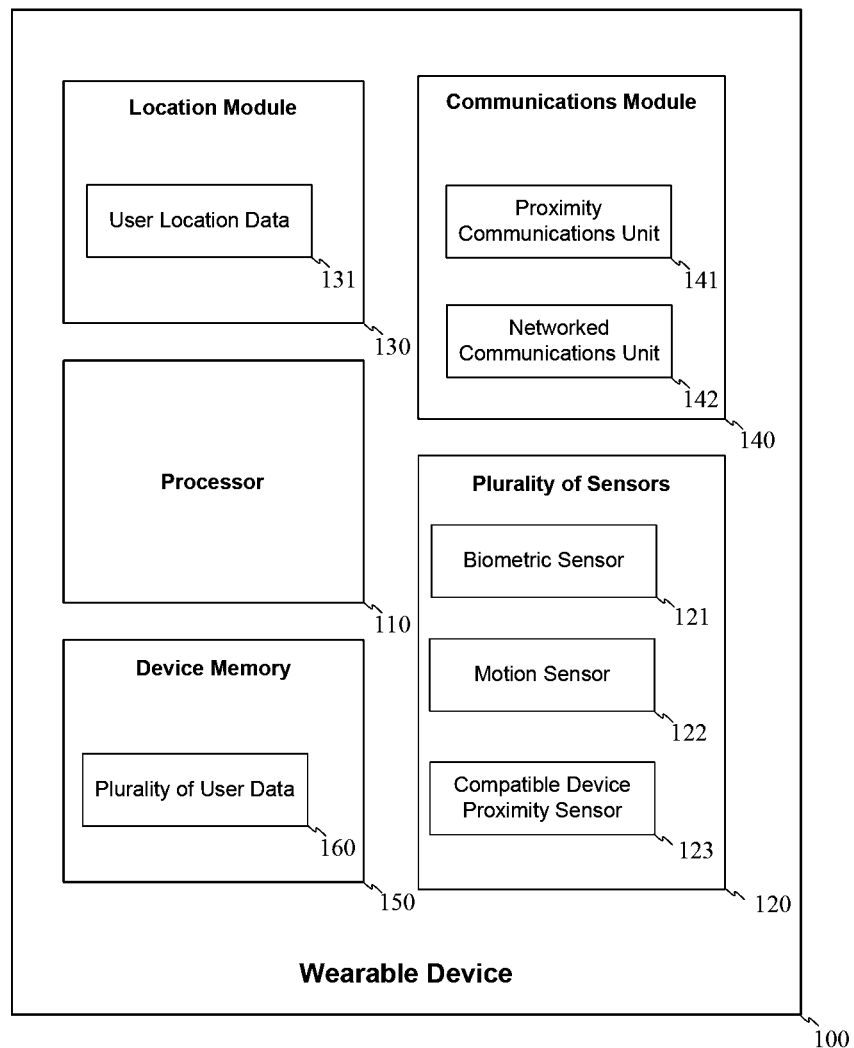
FIG. 3 is a block diagram displaying the components of the wearable device as per the current embodiment of the present invention.

Referencing FIG. 1-3, the present invention is a method of communicating information through a wearable device 100 to a plurality of compatible devices and systems. The method of communicating information through the wearable device 100 comprises the steps of receiving a plurality of user data 160 to the wearable device 100, storing the plurality of user data 160 received in wearable device 100, receiving a plurality of sensor data through the wearable device 100, monitoring the plurality of sensor data for an action initiating event, and transmitting user data to a compatible device or system upon detecting an action initiating event.

Figure 4:
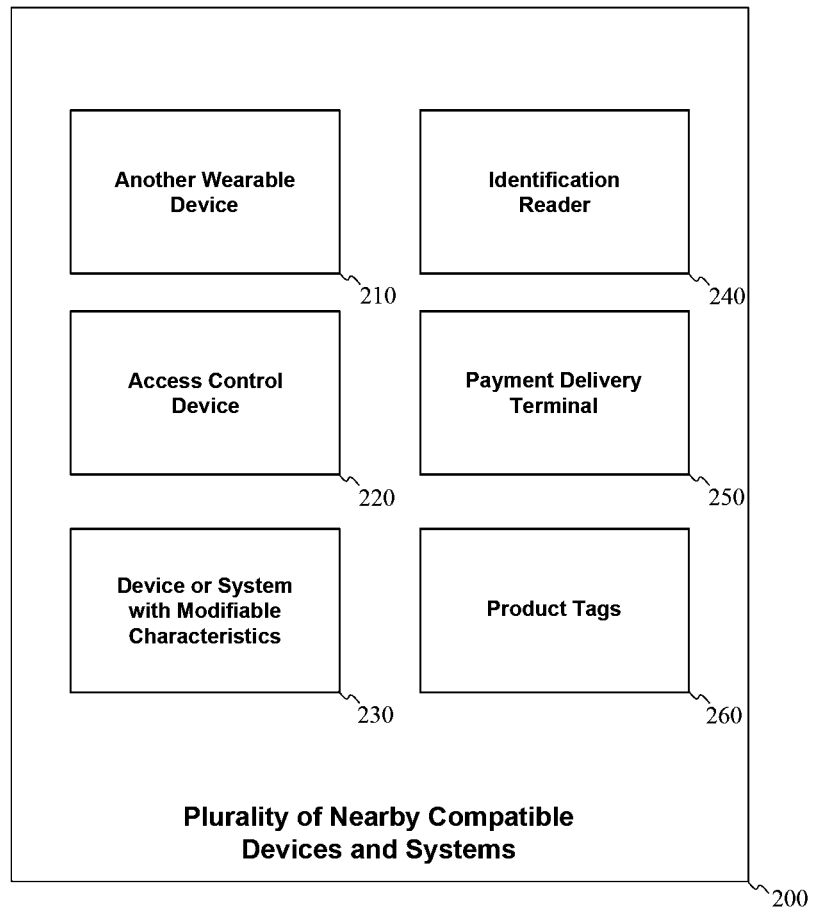
FIG. 4 is a block diagram displaying the plurality of nearby compatible devices and systems as per the current embodiment of the present invention.

Referencing FIG. 3 and FIG. 4, the method for communicating information through a wearable device 100 is provided with a wearable device 100 comprising a processor 110, a device memory 150, a plurality of sensors 120, a location module 130, and a communications module 140, and is provided with a plurality of nearby compatible devices and system comprising another wearable device 210, an access control device 220, a device or system with modifiable characteristics 230, an identification reader 240, a payment delivery terminal 250, and product tags 260.

Referencing FIG. 1, FIG. 3, FIG. 4, and FIG. 5, the wearable device 100 receives a plurality of user data 160 through the communications module 140. The plurality of user data 160 received is utilized is stored within the device memory 150. The plurality of user data 160 comprises user profile data 161, access control data 162, user preference data 163, secure financial data 165, and secure identification data 164. The plurality of user data 160 received through the communications module 140 can later be transmitted to a plurality of nearby compatible devices and systems. The wearable device 100 can receive the plurality of user data 160 from a nearby compatible device or system 200 through the proximity communications unit 141. The wearable device 100 can receive the plurality of user data 160 from a compatible device or system through a networked communications unit 142, wherein the networked communications unit 142 provides the wearable device 100 with internet access.

Referencing FIG. 1-3, the communication module transfers an unspecified amount of data between the wearable device 100 and nearby compatible devices and systems. The communication module receives and transfer user data from compatible nearby devices or systems. In the current embodiment of the present invention, the communications module 140 is used to transfer a plurality of information, including a plurality of user data 160, between the device memory 150 and compatible devices or systems. The communications module 140 transmits a plurality of user data 160 to nearby compatible devices or systems following a determination made by the processor 110, specifically action initiating events. The communications module 140 receives a plurality of user data 160 initially from a compatible device or system and stores the plurality of user data 160 in the device memory 150. The compatible device or system is not required to be near the wearable device 100 to transfer the plurality of user data 160 to the wearable device 100. In the current embodiment of the present invention, the communications module 140 comprises a proximity communications unit 141 and a networked communications unit 142. The proximity communications unit 141 transfers a plurality of data, including user data, to a plurality nearby compatible devices and systems found in close proximity to the wearable device 100. The networked communications unit 142 is provided as a means of communicating a plurality of data, including user data, across a network with internet access.

Referencing FIG. 1-4, the proximity communications unit 141 transmits and receives an unspecified amount of data between the wearable device 100 and a nearby compatible device. The proximity communications unit 141 can be accomplished by a plurality components and component systems that combine features for sending and receiving information. Preferably, the proximity communications unit 141 would function off of similar principals as an NFC module or RFID reader with read and write capabilities. Both of the aforementioned devices would be able to send and receive information from nearby compatible devices and systems. It should be noted that in an embodiment of the invention, a display screen and can be used to transmit visual information that is scannable by an optical reader of a nearby compatible device or system 200. The proximity communications unit 141 would utilize an alternate means to the display screen for receiving information that can include an optical reader.

Referencing FIG. 1-3, the networked communication unit transmits and receives an unspecified amount of data across a network with access to the internet. The networked communications unit 142 utilizes a connection with a networked device that has access to the internet. Although the networked communications unit 142 is provided as a means of communicating data across the internet, the specifics of the communication unit can be accomplished through the proximity communications unit 141, as a compatible device may have a network connection through which the wearable device 100 may transmit or pull data from. The wearable device 100 could utilize a Wi-Fi connection or a Bluetooth connection with a nearby compatible device or system 200 as a proximity connection. A proximity communication with a nearby compatible device or system 200 could permit access to a network with internet access.

Referencing FIG. 1-3 and FIG. 13, the location module 130 is provided as a separate component to the plurality of sensors 120 and the communications module 140. The location module 130 specifically collects user location data 131. The user location data 131 details the location of a user through information that details the location of the wearable device 100. In the current embodiment of the present invention, the location module 130 can be accomplished by a Global Positioning System (GPS) module that communicates with a network of orbiting satellites that calculate the relative location of the wearable device 100. The aforementioned embodiment that uses the GPS module would have functional overlaps with the communications module 140 as they would be able transmit and receive information. The distinction between the location module 130 and the communications module 140 is made in order to avoid confusion, as the communication module transfer an unspecified amount of data between the wearable device 100 and the compatible devices and system, while the locations module only communicates requests for and receives user location data 131 from the network of orbiting satellites.

Figure 5:
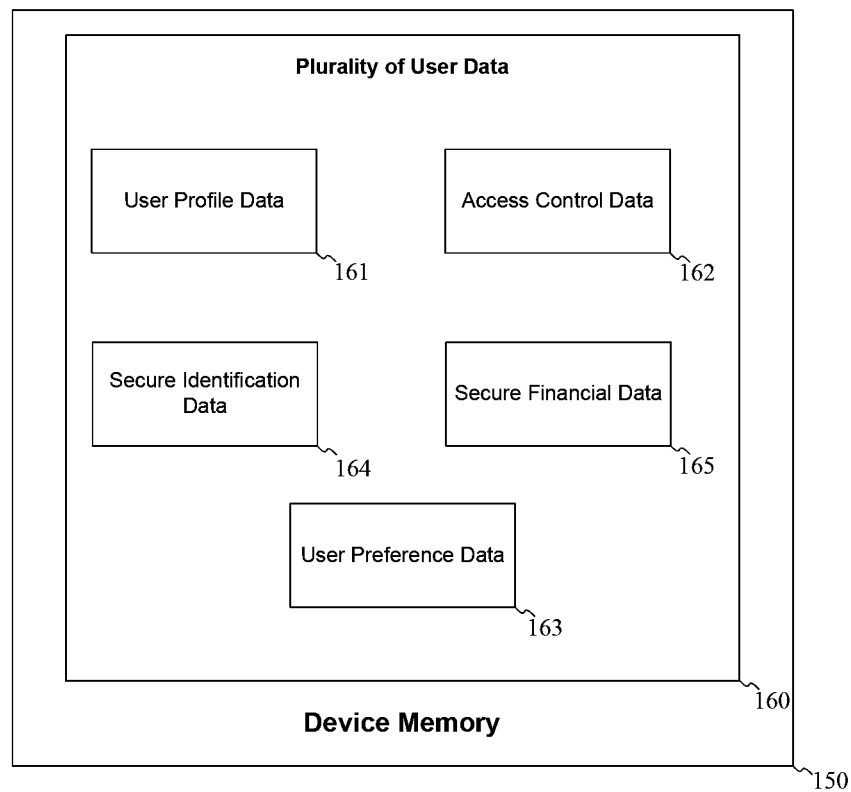
FIG. 5 is a block diagram displaying the plurality of user data stored within the device memory as per the current embodiment of the present invention.

Referencing FIG. 1, FIG. 3, and FIG. 5, the wearable device 100 stores the plurality of user data 160 received through the communication module within the device memory 150. The plurality of user data 160 stored within the device memory 150 in a retrievable format that is readily accessible to duplicate, transfer, or modify as needed by the processor 110.

Referencing FIG. 5, the device memory 150 is a data storage component for the wearable device 100. The device memory 150 store the plurality of user data 160 received from the communications module 140. The plurality of user data 160 is received and stored in the device memory 150 in a manner that facilitates duplication and transfer to nearby compatible devices and systems. The device memory 150 may comprise an unspecified amount storage space. The device memory 150 can use network storage provided through the communications module 140 to store, maintain, and retrieve a plurality of user data 160. In the aforementioned configuration describing network storage, the wearable device 100 may transmit an access token as a substitute to the user data that would allow a nearby compatible device or system 200 to access the user data and download it using a network connection. In the current embodiment of the present invention, the device memory 150 receive and stores a plurality of user data 160 comprising user profile data 161, access control data 162, user preference data 163, secure identification data 164, and secure financial data.

Figure 6:
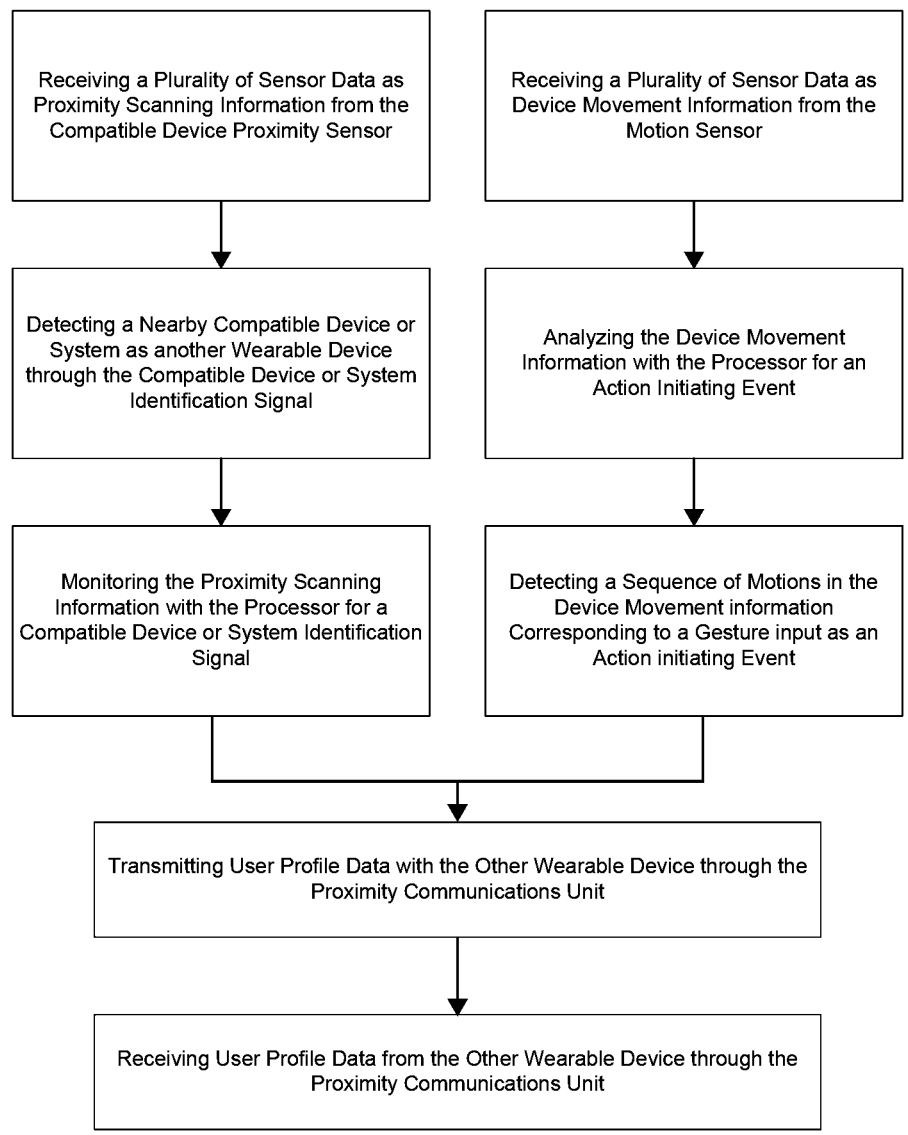
FIG. 6 is a flow chart diagram displaying the process of exchanging user data with another wearable device as per the current embodiment of the present invention.

Referencing FIG. 4-6, user profile data 161 is contact information or user specific data meant for distribution with a wide audience. User profile data 161 is end data in the method as the specifics of the user profile data 161 do not influence additional processes. The user profile data 161 is transmitted to another wearable device 210 but can be transmitted to a compatible nearby device or system. The user profile data 161 is distinct from access control data 162 and secure identification data 164. Although information in the user profile data 161 may be used as part of the access control data 162 and the secure identification data 164, the distinction is made as the user profile data 161 is general use and does not result in additional verifications.

Figure 7:
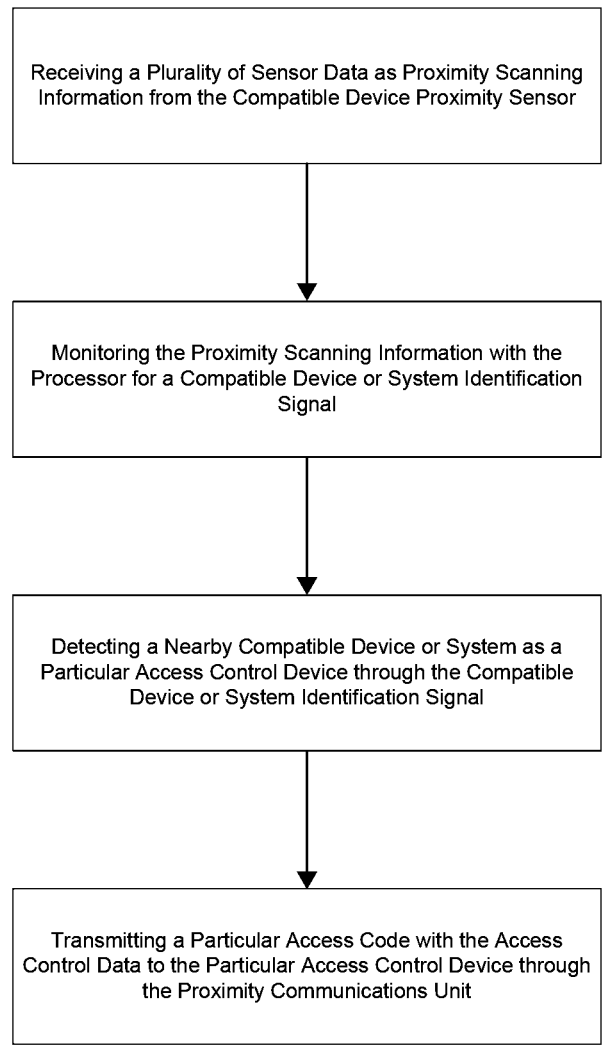
FIG. 7 is a flow chart diagram displaying the process of transmitting access control data to an access control device as per the current embodiment of the present invention.

Referencing FIG. 4, FIG. 5, and FIG. 7, access control data 162 contains an access code that is transmitted to a nearby access control device 220. The nearby access control device 220 is detected and identified by compatible device proximity sensor 123. The wearable device 100 identifies the access control device 220 as a particular access control device 220. The identification of the particular access control device 220 determines the particular access code to be transmitted in the access control data 162. Upon transmission of the access control data 162, a request may be sent by the access control device 220 to send user preference data 163. In the aforementioned scenario, the access control device 220 may be part of a system having modifiable characteristics 230 such as a work station, vehicle, or similar device or system.

Figure 8:
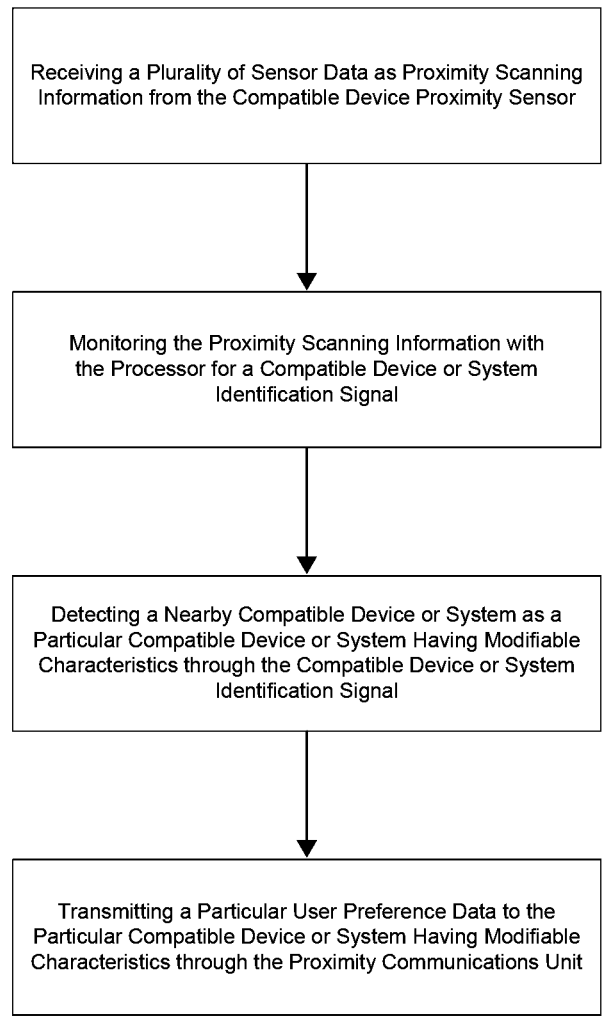
FIG. 8 is a flow chart diagram displaying the process of transmitting user preference data to a compatible device or system having modifiable characteristics as per the current embodiment of the present invention.
Figure 10:
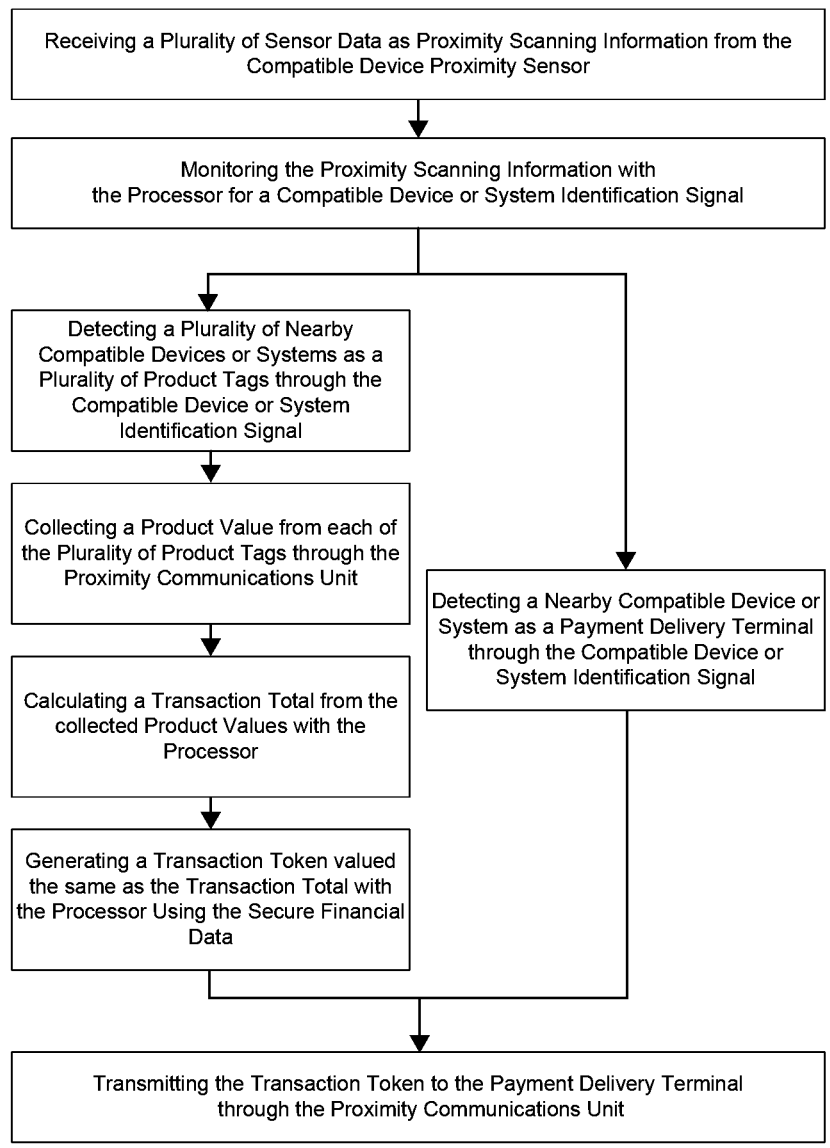
FIG. 10 is a flow chart diagram displaying the process of transmitting secure financial data to a payment delivery terminal as per an embodiment of the present invention.
Figure 11:
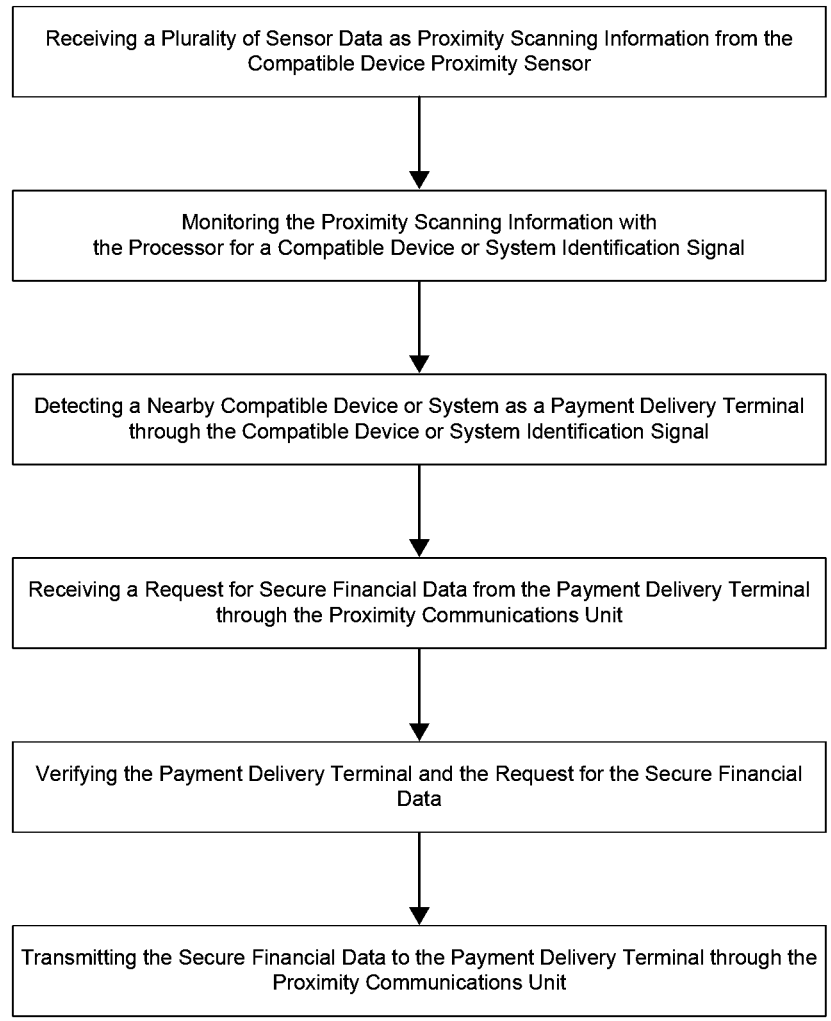
FIG. 11 is a flow chart diagram displaying the process of transmitting secure financial data to a payment delivery terminal as per another embodiment of the present invention.
Figure 12:
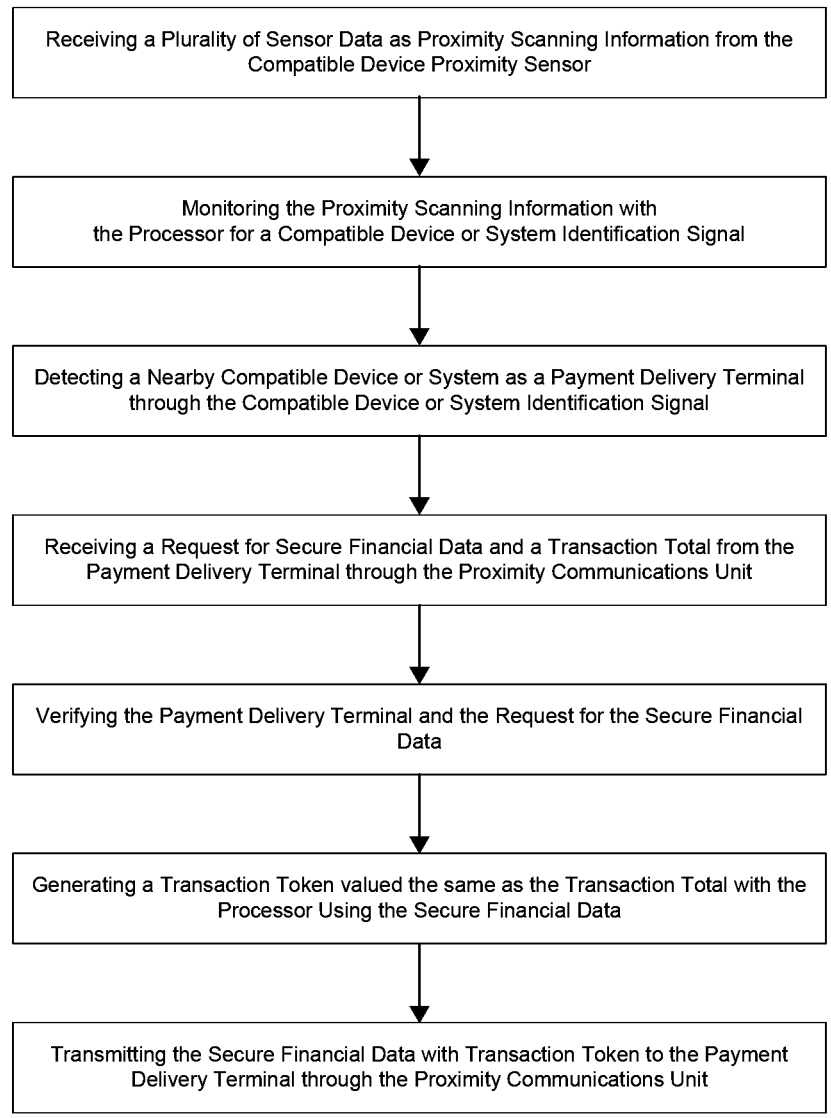
FIG. 12 is a flow chart diagram displaying the process of transmitting secure financial data to a payment delivery terminal as per yet another embodiment of the present invention.

Referencing FIG. 4, FIG. 5, and FIG. 8, user preference data 163 is user specific data relating to particular settings for a compatible device or system. The user preference data 163 is utilized primarily with device or systems that have modifiable characteristics 230 and are shared by multiple users. The user preference data 163 contains settings that allow the receiving compatible device or system to be personalized for each user. The user preference data 163 contains particular user settings or preferences that modify a particular device or system with modifiable characteristics 230. The particular user preference data 163 allows for the storage of a plurality of user preference data 163, each for a particular compatible device or system with modifiable characteristics 230, to be stored within the device memory 150. In an embodiment of the present invention, the user preference data 163 can be link with access control data 162. In the aforementioned embodiment, the access control device 220 would be part of a modifiable system that receives the particular access control data 162 linked with the particular the user preference data 163. In the aforementioned embodiment, the particular user preference data 163 would be transmitted with the particular access control data 162 but can also be transmitted upon the request of the modifiable system.

Referencing FIG. 4, FIG. 5, and FIG. 9, the secure identification data 164 is encrypted user information that is transferable to an identification reader 240. The secure identification data 164 is encrypted user information that can be either directly or indirectly linked the user information. When directly linked the encrypted user information contains encrypted personal user identification data such as name, address, contact information, and government identification information, as well as any information that could be used to identify a user through official means. When indirectly linked the encrypted user information contains encrypted identification profile information associated with a third party database verifiable by the identification reader 240. The wearable device 100 receives and verifies the request for secure identification data 164. The verification can occur through multi-factor authentication means.

Referencing FIG. 4, FIG. 5, and FIG. 10-13, secure financial data 165 is encrypted financial information that is directly linked or indirectly linked to a payment method. When directly linked the encrypted financial information contains encrypted account number for a payment method. When indirectly linked, the encrypted financial information contains encrypted payment profile data associated with a third party service that negotiates transaction fulfillment. Operationally, the difference between indirectly linked and directly linked encrypted financial information shouldn't have a significant difference in the transmittal of the secure financial data 165 to a nearby device. The main difference between directly linked and indirectly linked can be user preference in how the user data is submitted.

Referencing FIG. 3, the wearable device 100 receives a plurality of sensor data from the plurality of sensors 120. The plurality of sensors 120 are mounted throughout the wearable device 100 and function as the source of the plurality of sensor data. The plurality of sensor data is a stream of sensor information collected by the plurality of sensors 120. The processor 110 monitors and analyzes the plurality of sensor data to detect action initiating events. The action initiating events are identifiable signals or patterns in the plurality of sensor data that can represent a user's vitals signaling distress, specific series of movements signaling a gesture, and the detection of nearby compatible devices.

Referencing FIG. 2 and FIG. 3, the processor 110 monitors the plurality of sensor data in order to detect action initiating events. The processor 110 is a computerized component that monitors and analyzes a plurality of sensor data in order to detect identifiable signals in the plurality of sensor data that prompt the processor 110 to initiate a process or action. In the present invention, the identifiable signals are action initiating events as they initiate a response step in the method when detected by the processor 110. The processor 110 recognizes the action initiating events by matching known parameters sets with the information received through the plurality of sensor data. Referencing FIG. 7-13, in the monitoring steps, when the processor 110 is monitoring the plurality of sensor data, the processor 110 compares the known parameter sets to the conditions provided by the plurality of sensor data. Referencing FIG. 6, in the analysis steps, when the processor 110 analyzes the plurality of sensor data, the processor 110 detects patterns in the plurality of sensor data through a comparison with known parameter sets. The processor 110 calculates and verifies information received from nearby compatible devices or systems. In the calculation step the processor 110 receives a plurality of data from the compatible devices and system to generate particular values for use in further processes and steps. in the verification step, the processor 110 verifies a request and the nearby compatible device or system 200 that sent said request through an authentication process that can incorporate the use of the communications module 140 to exchange additional information between said nearby compatible device or system 200 with the wearable device 100 or to exchange information across a networked connection with a compatible device or system.

Referencing FIG. 3, in the current embodiment of the present invention the processor 110 monitoring the plurality of sensor data detects a plurality of action initiating events. The plurality of sensors 120 comprise biometric sensors 121, motion sensors 122, and compatible device proximity sensors 123.

Referencing FIG. 4 and FIG. 6-12, the compatible device proximity sensor 123 collects proximity scanning information that is monitored by processor 110. The proximity scanning information is a stream of scanning data collected by the compatible device proximity sensor 123. The proximity scanning information is monitored by the processor 110 in order to detect an action initiating event. The action initiating event is the detection of a compatible device or system identification signal. The compatible device identification signal is particular to each nearby compatible device or system 200 and is used as a means of identification and selecting the appropriate response. It should be noted that the compatible device proximity sensor 123 can be accomplished by any means of detection and identification of compatible system including wired and wireless of detection. Furthermore, the compatible device proximity sensor 123 can overlap with functions of the communications module 140 as the compatible device proximity sensor 123 can be accomplished by a Radio-frequency identification (RFID) reader and the Near field communications (NFC) module. In the aforementioned variation, the compatible device proximity sensor 123 would able to transmit and receive an unspecified amount of information but would mostly be used to detect the presence of nearby compatible devices. This would be primarily due to the passive nature of RFID tags and NFC tags which require an activation signal prior to responding with information.

Referencing FIG. 3 and FIG. 6, the motion sensors 122 are particularly positioned sensors that collect a stream of device movement information for the wearable device 100. In the current embodiment of the present invention, the motion sensors 122 can be provided as accelerometers but can be accomplished by any means of accurately detecting the movement of the wearable device 100. The device movement information is a stream of motion data collected by the motion sensors 122. The device movement information is analyzed by the processor 110 in order to detect action initiating events. The action initiating events detected in the device movement information correspond to patterns in the stream of motion data that identify known gestures. The known gestures are particular motions occurring in sequence that correspond to an identifiable user input.

Figure 13:
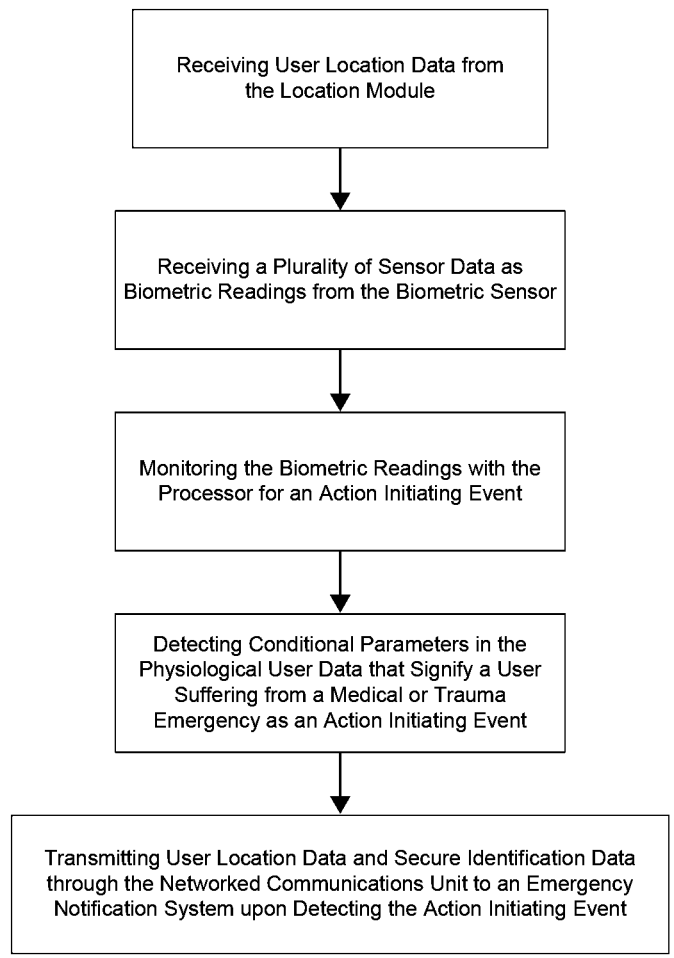
FIG. 13 is a flow chart diagram displaying the process of transmitting user location information and secure identification information to an emergency notification system.

Referencing FIG. 3 and FIG. 13, the biometric sensors 121 are particularly positioned sensors that specifically collect a stream physiological user data. The physiological user data collected by the biometric data are interpreted as biometric reading which are quantifiable measurements from an analog source. The biometric readings are a stream of physiological user data collected through the biometric sensors 121. The biometric readings are monitored by the processor 110 in order to detect an action initiating event. The action initiating events detected in the biometric readings are conditional parameters in the physiological user data that signify a user suffering from a medical or trauma emergency. In the current embodiment of the present invention, the biometric sensor 121 may collect physiological data such as heart rate, heart rhythm, pulse oxidation information as well as a plurality of additional information that can be analyzed to determine if the user is suffering from a medical or trauma emergency.

Referencing FIG. 3-12, in the current embodiment of the present invention, the processor 110 responds to detection of an action initiating event by exchanging user profile data 161 with another wearable device 210, transmitting access control data 162 to a nearby access control device 220, transmitting user preference data 163 to a nearby compatible device or system 200, transmitting secure identification data 164 to an identification reader 240, and transmitting secure financial data 165 to a payment delivery terminal 250. Additionally, the processor 110 can respond by transmitting user location data 131 and secure identification data 164 through the networked communications unit 142 to an emergency notification system.

Referencing FIG. 3-6, the wearable device 100 exchanges user profile data 161 with another wearable device 210 though the proximity communications unit 141. The process of exchanging the user profile data 161 comprises several steps that are not required to occur in sequence unless otherwise noted. The processor 110 receives a plurality of sensor data as proximity scanning information from the compatible device proximity sensor 123. The processor 110 monitors the proximity scanning information for a compatible device or system identification signal. The processor 110 detects a compatible device or system identification signal and identifies the nearby compatible device or system 200 as another wearable device 210. The other wearable device 100 is identified through the compatible device or system identification signal. In addition to receiving and monitoring the proximity scanning information, the processor 110 receives device movement information from the motion sensor 122. The device movement information is stream of motion data collected by the motion sensor 122 and analyzed by the processor 110. The analysis of the device movement information is to detect a sequence of motions in the device movement information that corresponds to a gesture input. The gesture input is understood as an action initiating event. The gesture input and the detection of the device proximity result in the processor 110 transmitting the user profile data 161 to the other wearable device 100 through the proximity communications unit 141. To complete the exchange the wearable device 100 receives user profile data 161 from the other wearable device 100 through the proximity communications unit 141. The processor 110 stores the user profile data 161 received from the other wearable device 100 separately in the device memory 150.

Referencing FIG. 3-5 and FIG. 7, the wearable device 100 transmits access control data 162 to a nearby access control device 220 through the proximity communications unit 141. The process of transmitting the access control data 162 comprises several steps that are not required to occur in sequence unless otherwise noted. The processor 110 receives a plurality of sensor data as proximity scanning information from the compatible device proximity sensor 123. The processor 110 monitors the proximity scanning information for a compatible device or system identification signal. The compatible device or system identification signal is an action initiating event. The processor 110 detects a compatible device or system identification signal and identifies a particular access control device 220. The particular access control device 220 is identified from other access control devices 220 through the compatible device or system identification signal. In an additional embodiment, the particular access control device 220 can be identified through a verification step. With the detection and identification of the particular access control device 220, the processor 110 selects the particular access code corresponding to the particular access control device 220. The processor 110 transmits the particular access code with the access control data 162 to the particular access control device 220 through the proximity communications unit 141.

Referencing FIG. 3-5 and FIG. 8, the wearable device 100 transmits user preference data 163 to a nearby access control device 220 through the proximity communications unit 141. The process of transmitting the user preference data 163 comprises several steps that are not required to occur in sequence unless otherwise noted. The processor 110 receives a plurality of sensor data as proximity scanning information from the compatible device proximity sensor 123. The processor 110 monitors the proximity scanning information for a compatible device or system identification signal. The compatible device or system identification signal is an action initiating event. The processor 110 detects a compatible device or system identification signal and identifies a particular compatible device or system having modifiable characteristics 230. The particular compatible device or system having modifiable characteristics 230 is identified from a plurality of devices or systems having modifiable characteristics 230 through the compatible device or system identification signal. With the detection and identification of the particular compatible device or system having modifiable characteristics 230, the processor 110 selects the particular user preference data 163 corresponding to the particular device or system having modifiable characteristics 230. The processor 110 transmits the particular user preference data 163 through the proximity communications unit 141. It should be noted that the transmission of the user preference data 163 can occur in conjunction with the transmission of the access control data 162 as the access control device 220 can be a component of a compatible system having modifiable characteristics 230.

Referencing FIG. 3-5 and FIG. 9, the wearable device 100 transmits secure identification data 164 to an identification reader 240 through the proximity communications unit 141. The process of transmitting the secure identification data 164 comprises several steps that are not required to occur in sequence unless otherwise noted. The processor 110 receives a plurality of sensor data as proximity scanning information from the compatible device proximity sensor 123. The processor 110 monitors the proximity scanning information for a compatible device or system identification signal. The processor 110 detects a compatible device or system identification signal and identifies an identification reader 240. The identification reader 240 is identified through the compatible device or system identification signal but does not need to be differentiated from a plurality of identification readers 240 as they would all request the same secure identification data 164. In addition to receiving and monitoring the proximity scanning information, the wearable device 100 receives a request for the secure identification data 164 from the identification reader 240 through the proximity communications unit 141. Prior to transmitting the secure identification data 164, the processor 110 verifies the identification reader 240 and the request for the secure identification data 164 through an authentication process. It should be noted that the authentication process could be a multifactor authentication process as well as any secure and efficient means of verification. Upon completing the verification of the identification reader 240 and the request for the secure identification data 164, the processor 110 transmits the secure identification data 164 to the identification reader 240 through the proximity communications unit 141.

Referencing FIG. 3-5 and FIG. 10-13, the wearable device 100 transmits secure financial data 165 to a payment delivery terminal 250 through the proximity communications unit 141. The process of transmitting the secure financial data 165 comprises several steps that are not required to occur in sequence unless otherwise noted. The processor 110 receives a plurality of sensor data as proximity scanning information from the compatible device proximity sensor 123. The processor 110 monitors the proximity scanning information for a compatible device or system identification signal. The processor 110 detects a plurality of compatible device or system identification signals and identifies them as a plurality of product tags 260. The plurality of product tags 260 each comprise a product value. The compatible device or system identification signal identifies each product tag 260 and can identity their associated product value. In addition to detecting the plurality of product tags 260, the processor 110 also detects and identifies a payment delivery terminal 250 through the compatible device or system identification signal.

Referencing FIG. 3-5 and FIG. 10-13, in the current embodiment of the present information, the secure financial data 165 is transmitted to the payment delivery terminal 250 in at least three possible configurations that are dependent on conditions such as the receiving a request for secure financial data 165, collecting product values and calculating a transaction total, receiving a transaction total, generating a transaction token, and verifying the payment delivery terminal 250. In the current embodiment, the nearby compatible devices and systems comprise a payment delivery terminal 250 and a plurality of product tags 260 each comprising a product value. The payment delivery terminal 250 is the nearby compatible system that receives the secure financial data 165. The plurality of product tags 260 are nearby compatible devices that containing value information that is collected to calculate a transaction total.

Referencing FIG. 3-5 and FIG. 10, in an embodiment of the present invention, the wearable device 100 selectively collects product values from the plurality of product tags 260. The proximity communications unit 141 collects the product value for each product tag 260. The processor 110 aggregates the product values to calculate the transaction total. The wearable device 100 generates a transaction toke from using the secure financial data 165 and the transaction total wherein the transaction token is valued the same as the transaction total. The transaction total is used with the encrypted financial information to generate a transaction token for the exact amount of the transaction total that is then transmitted to a nearby payment delivery terminal 250 through the proximity communications unit 141. It should be noted that a verification step for the payment delivery terminal 250 can be included to ensure better security measure.

Referencing FIG. 3-5 and FIG. 11, in an embodiment of the present invention, the wearable device 100 receives a request for secure financial data 165 from a payment delivery terminal 250. The request is received through the proximity communications unit 141. The processor 110 verifies the request for the secure financial data 165 and verifies the payment delivery terminal 250 through an authentication means. The wearable device 100 fulfills the request by transmitting the secure financial data 165 to the verified payment delivery terminal 250.

Referencing FIG. 3-5 and FIG. 12, in an embodiment of the present invention, the wearable device 100 receives a request for secure financial data 165 from the payment delivery terminal 250. The request for secure financial data 165 comprises the transaction total of the particular product tags 260. The processor 110 verifies the request for secure financial data 165 and verifies the payment delivery terminal 250. The processor 110 utilizes the transaction total from the verified request to generate a transaction token for the same value as the transaction total. The wearable device 100 then transmits the secure financial data 165 containing the transaction total.

Referencing FIG. 3-5 and FIG. 13, the wearable device 100 transmits user location data 131 and secure identification data 164 through a networked communications unit 142 to an emergency notification system. The process of transmitting the user location data 131 and the user identification data comprises several steps that are not required to occur in sequence unless otherwise noted. The processor 110 receives a plurality of sensor data as user location data 131 from the location module 130 and biometric reading from the biometric sensors 121. The biometric readings are a stream of physiological user data that is monitored by the processor 110. The processor 110 monitors the biometric reading for conditional parameters in the physiological user data that signify a user suffering from a medical or trauma emergency. The detection of the conditional parameters is interpreted as the action initiating event. The processor 110 retrieves the secure identification data 164 and pulls the last known value of the user location data 131 and transmits the values over a networked connection. The values are transmitted to an emergency notification system. The emergency notification system is a secure system or can be a network accessible emergency service such as 9-1-1.

In an embodiment of the invention, the wearable device is an information storage and exchange wristband which is designed to be worn on the wrist of a user and to enable that user to quickly and easily transfer information to another user of the invention. The invention is also capable of storing general information such that it may be retrieved by the user or other authorizing parties at a later date. The invention can also transfer information to external computing devices, thereby opening up many possible uses for the invention. The invention comprises a wristband, a digital information storage unit, a global positioning system (GPS) beacon, and a user interface.

The wristband is the component which allows the invention to be worn on the user's wrist. The wristband comprises an inner surface and an outer surface and is generally circular in shape. The distance between the inner surface and the outer is the thickness of the wristband. The thickness of the wristband is sufficient to ensure that the wristband does not easily rip or tear, however the wristband should not be so thick that it is bulky. The invention is designed to be worn by the user whenever they are at work or in public and as a result, the smaller and more discreet the wristband is, the better. The exact thickness of the wristband may depend upon the material which is used in the manufacture of the wristband. The material used in the manufacture of the wristband is flexible and can elastically deform such that the wristband can be expanded and slid over the users hand and onto their wrist. Suitable materials for the wristband include but are not limited to rubber and silicon. Alternatively, the wristband may be manufactured from non elastic materials such as leather if a clasp is applied such that the wristband may be opened or widened mechanically.

The digital information storage unit is the heart of the invention's functionality, and allows the invention to store and exchange information quickly with other iteration of the invention and with external computing devices. The digital information storage unit is physically embedded within the wristband, thereby minimizing the amount of space it occupies on the invention. Alternatively, the digital information storage unit may be embedded within a small housing which is then adhered or otherwise fastened to the wristband. The housing may be manufactured out of any light rigid material including but not limited to aluminum and plastic. The digital information storage unit enables storage and exchange of various different kinds of digital information; the digital information storage unit is powered by a small battery which is either embedded within the wristband or mounted within the housing. The battery is only necessary for exchanging information, as it is known that digital information can be physically stored without power as with a flash drive for example. The invention is meant to operate for long periods of time, and as such, it is idea for the invention to have minimal power demands. There are several different methods of low energy information exchange which may be suitable for use with the invention.

One such method of information exchange is through the use of a quick response (QR) code. QR codes are small flat images which comprise a plurality of squares which can be read by an imaging scanner. When the QR code is read by an imaging scanner, it is able to discern any information that is stored in the QR code. Resultantly, it is necessary for the invention to also possess an imaging scanner if the QR code method of exchanging information is utilized. Typically, QR codes are permanently printed on a surface, meaning that the QR code itself does not change. However, since the invention is intended to be utilized with potentially changing information, it is necessary for the QR code to be alterable. In response to this, the invention may utilize a display method known as electronic paper. Electronic paper allows the invention to alter the QR code while also maintaining very low energy usage.

Another method of information exchange which may be utilized is radio frequency identification (RFID). The RFID method utilizes a well known technology in order to allow information to be exchanged. A re-writable RFID chip is embedded within the wristband and can be read by any external RFID reader. Re-writeable RFID chips can be altered such that different information is stored on them. This ensures that the information which is exchanged by the invention can be altered by the user. In compliance with the object of the invention to allow exchange of information between various iterations of the invention, the invention includes an RFID reader which enables it to read the information stored on an RFID chip. Thus, the invention is able to read information stored on another of the invention.

The digital information storage unit also comprises a trigger mechanism. The trigger mechanism determines when the invention attempts to read information from another of the invention. There are many different ways in which the invention may be triggered. One method of triggering the invention may make use of a simple button which activates the RFID or QR code reader. Alternatively, the invention may include a MEMs accelerometer which is capable of determining changes in motion. Thus, the invention may be triggered by motions such as bumps or handshakes. It is also possible that the invention may be activated by proximity to another of the invention, thereby automatically scanning for information. This function may be ideal for large social gatherings such as parties as the invention would automatically gather contact information from nearly everyone at the social gathering so long as the user came within close proximity of them. Information which is collected by the invention may either be stored in onboard physical memory, or it may be automatically wirelessly transmitted to another mobile device such as a smart phone or transmitted to cloud storage servers for later access by the user.

It is important to note that the information stored within the invention may be segmented into different groups. For example the digital information storage unit may be broken into segments including but not limited to storage only, exchangeable, and emergency. Information that is categorized as storage only is information that is only stored and is not transmitted to other of the invention or external computing devices. This enables the user of the invention to store and transport information via the invention without actually sharing it with any other people. Information which is stored in the exchangeable segment is information which is automatically transmitted to external computing devices and others of the invention. Information which is stored under the emergency segment may be accessed by medical professionals and contains information including but not limited to name, emergency contact, blood type, allergies, and disorders. This may be useful if the user is involved in an accident and is incapacitated such that they cannot provide these details to medical professionals.

The GPS beacon is embedded directly within the wristband. Alternatively the GPS beacon may be mounted within the housing. The purpose of the GPS beacon is to enable tracking of the movements of the user. This is an optional feature, and may be useful for functions such as keeping track of convicted criminals in a discreet way after they have been released from incarceration. It is also possible that the GPS beacon could be utilized in conjunction with software to track the location of multiple contacts which the user may know. Thus the user would be able to discover if they are currently near any of their friends.

The user interface allows the user of the invention to modify and retrieve any information which is stored on the invention. The user interface is a software program which is run on an external computing device such as a desktop computer, tablet or a smart phone. The user interface may connect to the invention using either a wired or a wireless method or via the cloud. Through the user interface, the user may retrieve information stored on the invention, modify exchangeable information, and modify emergency information; thus ensuring that the invention is always storing the most recent and accurate information pertaining to the user.

The invention eliminates the need for keys and different pieces of identification whereas the product will store electronic signatures such in a way similar to a key fob which stores the electronic signature or code that enables the open/close process of locks or entrances through the ability to open doors and access high level access areas via protocols-identifiable via the system. Maybe used to start your car open door. With the invention a user can scan bracelet against home door lock to access home, no more need for keys can start car or any application to replace the use of keys The invention can be set with entitlements or various degree of access dependent upon the system to which it is part of thereby potentially allowing access to restricted areas. The invention is an identification system and is used in conjunction with smart home systems which enable user to control every aspect of the home.

When a person opens the home system using the invention, the person may interact with the full system as if plugging in full access and control of the system. May issue voice commands virtual movements or anything user programs.

The invention can also act as a "quick access pass" where the device is read by an application to access the information or secured data or secured location. The invention can also access service data set and has the ability to access secure data set. With their invention a Person can pick up products and walk thru scanner and scanner will pick up both products and band/bracelet allowing consumer "quick checkout" Scanner will then total all products while bracelet will supply payment. In essence human "speed pass" enables user to pay without standing in line as user passes through scanner all products will be totaled and purchasers pay source will be used, and receipt issued.

The invention may also be used to get bonuses for companies—entitling "points for use programs" or "rewards programs". The invention will allow collection of information for the purpose of personal advertising services. Kiosk access via bracelet.

Some additional possible uses and functions of the invention are hereinafter listed. The invention holds all identification material and can be used to keep gun control information, criminal background checks, and information on credit checks. Can be used in parks to communicate with patrons and give access or quick pay services—eliminates lines or need for check out personnel. Spending limits can be placed on accounts via band/bracelet and fingerprint, eye scan, or personal pin code is needed to access payment options (dependent upon the level of security which is set by user. Not required but is set by user for simplicity of use. Band can be programmed for concierge services to allow quick access to any services available.

The invention may also include a 911 button in case of emergency. Using the invention, a person can be located via the built in GPS. Emergency services in area are alerted to the emergency. Contact information is already prompted in the system as button is pressed on bracelet. Also dials 911 if cell phone or home phone is in vicinity enabling person to talk and dial. The 911 button is best used in situations when the person is unable to call 911 such as with a heart attack, stabbing, rape, attack, and hand or limb dismemberment.

The invention configured as a bracelet/band can also help to track criminals or offenders with GPS real time information.

The invention has the ability to point to social media via scanner—quick access to facebook, twitter, kickstarter etc, all social media, where as profiles will be secondary backup for identification purposes.

The invention has the ability to serve as a passport document. The invention can hold passport information to travel, driver's license information. A user can scan docs from computer to bracelet for easy carry or portability replacing use of portable storage devices. The invention can store briefcases full of information.

The invention can store virtual business cards where two people wearing the bracelet/band can exchange information with a handshake motion or bump of the bracelet.

The invention can incorporate feature such as fingerprint activation needed to power up bracelet so as unauthorized users cannot access information for security.

The invention can incorporate feature such as virtual wallet enabling person to place info normally carried in wallet on chip i.e., id cards, credit cards, store cards, gift cards, etc.

The invention can incorporate feature such as allowing a user to update information via internet or other proprietary software, app or via cloud applications. All information easily updated via tablet, computer, smart phone, or any source chosen by user.

The invention can incorporate feature such as the ability to share chosen information with "bump ability" when wristbands/bracelets touch.

The invention can incorporate feature such as allowing function in conjunction with any video game system, smart TV to access the information or transport user data to any other system. The invention can incorporate feature such as allowing a user to access user data or system data. For instance the invention can allow Video game connectability where the invention can be used to plug into system and identify player so that player can access system data. The invention can incorporate feature allowing people to friend find if user chooses. A person can be added to a network via app and find where their friend or family member is located via the bracelet automatically.

The invention can incorporate feature such as monitoring medical reminders or any type of appointment. This can be done as an alarm type system to alert via cell phone or any electronic device reminding an older patient to remember. An App can be connected to monitor blood pressure and heart rate via the bracelet/band. Band store medical information which when scanned will provide all medical data on screen so the persons medical charts are accessed along with any personal identifiable data such as drivers license and picture pops up on screen for verification.

Although the invention has been explained in relation to its preferred embodiment, it is to be understood that many other possible modifications and variations can be made without departing from the spirit and scope of the invention as hereinafter claimed.

What is claimed is:

1. A method of communicating information through a wearable device comprises the steps of:
providing a wearable device comprising a processor, a plurality of sensors, device memory, and a communications module;
providing a plurality of nearby compatible devices and systems, wherein the plurality of nearby compatible devices and systems comprise an access control device, a compatible device or system having modifiable characteristics, a payment delivery terminal, and an identification reader;
providing the communications module comprising a proximity communications unit and a networked communications unit;
receiving a plurality of user data through the communications module, wherein the plurality of user data comprises user profile data, access control data, user preference data, secure financial data, and secure identification data;
storing the plurality of user data received through the communications module in the device memory, wherein the plurality of user data being retrievable from the device memory;
receiving a plurality of sensor data from the plurality of sensors;
monitoring the plurality of sensor data with the processor;
detecting a plurality of action initiating events in the plurality of sensor data;
exchanging user profile data with another wearable device though the proximity communications unit;
transmitting access control data to an access control device through the proximity communications unit;
transmitting user preference data to the compatible device or system with modifiable characteristics through the proximity communications unit;
transmitting secure identification data to an identification reader through the proximity communications unit;
transmitting secure financial data to a payment delivery terminal through the proximity communications unit;
providing the plurality of sensors comprising a compatible device proximity sensor;
receiving a plurality of sensor data as proximity scanning information from the compatible device proximity sensor;
monitoring the proximity scanning information with the processor for a compatible device or system identification signal;
detecting a nearby compatible device or system as a particular access control device through the compatible device or system identification signal;
transmitting a particular access code with the access control data to the particular access control device through the proximity communications unit;
providing the plurality of sensors comprising a compatible device proximity sensor;

receiving a plurality of sensor data as proximity scanning information from the compatible device proximity sensor;

monitoring the proximity scanning information with the processor for a compatible device or system identification signal;

detecting a nearby compatible device or system as a particular compatible device or system having modifiable characteristics through the compatible device or system identification signal;

transmitting a particular user preference data to the particular compatible device or system having modifiable characteristics through the proximity communications unit;

providing the plurality of sensors comprising a compatible device proximity sensor;

receiving a plurality of sensor data as proximity scanning information from the compatible device proximity sensor;

monitoring the proximity scanning information with the processor for a compatible device or system identification signal;

detecting a nearby compatible device or system as an identification reader through the compatible device or system identification signal;

receiving a request for the secure identification data from the identification reader, wherein the request for the secure identification data being received through the proximity communications unit;

verifying the identification reader and the request for the secure identification data; and transmitting the secure identification data to the identification reader through the proximity communications unit following verification of the secure identification data and the request for the secure identification data.

2. The method of communicating information through a wearable device as claimed through claim 1 comprises the steps of:

receiving the plurality of user data from a nearby compatible device or system through the proximity communications unit; and receiving the plurality of user data from a compatible device or system through the networked communications unit.

3. The method of communicating information through a wearable device as claimed through claim 1 comprises the steps of:

providing the wearable device comprising a location module;

providing the plurality of sensors comprising a biometric sensor;

receiving user location data from the location module;

receiving a plurality of sensor data as biometric readings from the biometric sensor, wherein biometric readings are a stream of physiological user data collected by the biometric sensor;

monitoring the biometric readings with the processor for an action initiating event;

detecting conditional parameters in the physiological user data that signify a user suffering from a medical or trauma emergency as an action initiating event; and transmitting user location data and secure identification data through the networked communications unit to an emergency notification system upon detecting the action initiating event.

4. The step of exchanging user profile data as claimed in claim 1 comprises the steps of:

providing the plurality of sensors comprising a compatible device proximity sensor and a motion sensor;

receiving a plurality of sensor data as proximity scanning information from the compatible device proximity sensor;

monitoring the proximity scanning information with the processor for a compatible device or system identification signal;

detecting a nearby compatible device or system as another wearable device through the compatible device or system identification signal;

receiving a plurality of sensor data as device movement information, wherein the device movement information is stream of motion data collected by the motion sensor;

analyzing the device movement information with the processor for action initiating event;

detecting a sequence of motions in the device movement information corresponding to a gesture input as an action initiating event;

transmitting user profile data with the other wearable device through the proximity communications unit; and receiving user profile data from the other wearable device through the proximity communications unit.

5. The step of transmitting secure financial data as claimed in claim 1 comprises the steps of:

providing the plurality of sensors comprising a compatible device proximity sensor;

receiving a plurality of sensor data as proximity scanning information from the compatible device proximity sensor;

monitoring the proximity scanning information with the processor for a compatible device or system identification signal;

detecting a plurality of nearby compatible devices or systems as a plurality of product tags, wherein each product tag of the plurality of product tags comprises a product value; and detecting a nearby compatible device or system as a payment delivery terminal.

6. The step of transmitting secure financial data as claimed in claim 5 comprises the steps of:

collecting the product values from the plurality of product tags through the proximity communications unit;

calculating a transaction total from the collected product values with the processor;

generating a transaction token with the processor using the secure financial data and the transaction total, wherein the transaction token is valued the same as the transaction total; and transmitting the transaction token to the payment delivery terminal through the proximity communications unit.

7. The step of transmitting secure financial data as claimed in claim 5 comprises the steps of:

receiving a request for secure financial data from the payment delivery terminal, wherein the request for secure financial data being received through the proximity communications unit;

verifying the payment delivery terminal and the request for the secure financial data; and transmitting the secure financial data to the payment delivery terminal through the proximity communications unit following verification of the payment delivery terminal and the request for the secure financial data.

8. The step of transmitting secure financial data as claimed in claim 7, wherein the request for secure financial data comprises a transaction total and where the secure financial data comprises a transaction token valued the same as the transaction total.

9. A method of communicating information through a wearable device comprises the steps of:
   providing a wearable device comprising a processor, a plurality of sensors, device memory, a communications module, and a location module;
   providing a plurality of nearby compatible devices and systems, wherein the plurality of nearby compatible devices and systems comprise an access control device, a compatible device or system with modifiable characteristics, a payment delivery terminal, and an identification reader;
   providing the communications module comprising a proximity communications unit and a networked communications unit;
   providing the plurality of sensors comprising a compatible device proximity sensor, a motion sensor, and a biometric sensor;
   receiving a plurality of user data through the communications module, wherein the plurality of user data comprises user profile data, access control data, user preference data, secure financial data, and secure identification data;
   receiving the plurality of user data from a nearby compatible device or system through the proximity communications unit;
   receiving the plurality of user data from a compatible device or system through the networked communications unit;
   storing the plurality of user data received through the communications module in the device memory, wherein the plurality of user data being retrievable from the device memory;
   receiving a plurality of sensor data from the plurality of sensors;
   monitoring the plurality of sensor data with the processor;
   detecting a plurality of action initiating events in the plurality of sensor data;
   receiving a plurality of sensor data as proximity scanning information from the compatible device proximity sensor;
   monitoring the proximity scanning information with the processor for a compatible device or system identification signal;
   exchanging user profile data with another wearable device though the proximity communications unit;
   detecting a nearby compatible device or system as a particular access control device through the compatible device or system identification signal;
   transmitting a particular access code with the access control data to the particular access control device through the proximity communications unit;
   detecting a nearby compatible device or system as a particular compatible device or system having modifiable characteristics through the compatible device or system identification signal;
   transmitting a particular user preference data to the particular compatible device or system having modifiable characteristics through the proximity communications unit;
   transmitting secure identification data to an identification reader through the proximity communications unit;
   transmitting secure financial data to a payment delivery terminal through the proximity communications unit;
   receiving user location data from the location module;
   receiving a plurality of sensor data as biometric readings from the biometric sensor, wherein biometric readings are a stream of physiological user data collected by the biometric sensor;
   monitoring the biometric readings with the processor for an action initiating event;
   detecting conditional parameters in the physiological user data that signify a user suffering from a medical or trauma emergency as an action initiating event; and
   transmitting user location data and secure identification data through the networked communications unit to an emergency notification system upon detecting the action initiating event.

10. The step of exchanging user profile data as claimed in claim 9 comprises the steps of:
    receiving a plurality of sensor data as device movement information, wherein the device movement information is stream of motion data collected by the motion sensor;
    detecting a nearby compatible device or system as another wearable device through the compatible device or system identification signal;
    analyzing the device movement information with the processor for action initiating event;
    detecting a sequence of motions in the device movement information corresponding to a gesture input as an action initiating event;
    transmitting user profile data with the other wearable device through the proximity communications unit; and
    receiving user profile data from the other wearable device through the proximity communications unit.

11. The step of transmitting secure identification data as claimed in claim 9 comprises the steps of:
    detecting a nearby compatible device or system as an identification reader through the compatible device or system identification signal;
    receiving a request for the secure identification data from the identification reader, wherein the request for the secure identification data being received through the proximity communications unit;
    verifying the identification reader and the request for the secure identification data; and
    transmitting the secure identification data to the identification reader through the proximity communications unit following verification of the secure identification data and the request for the secure identification data.

12. The step of transmitting secure financial data as claimed in claim 9 comprises the steps of:
    monitoring the proximity scanning information with the processor for a compatible device or system identification signal;
    detecting a plurality of nearby compatible devices or systems as a plurality of product tags, wherein each product tag of the plurality of product tags comprises a product value; and
    detecting a nearby compatible device or system as a payment delivery terminal.

13. The step of transmitting secure financial data as claimed in claim 12 comprises the steps of:
    collecting the product values from the plurality of product tags through the proximity communications unit;
    calculating a transaction total from the collected product values with the processor;
    generating a transaction token with the processor using the secure financial data and the transaction total, wherein the transaction token is valued the same as the transaction total; and transmitting the transaction token to the payment delivery terminal through the proximity communications unit.

14. The step of transmitting secure financial data as claimed in claim 12 comprises the steps of:
    receiving a request for secure financial data from the payment delivery terminal, wherein the request for secure financial data being received through the proximity communications unit;
    verifying the payment delivery terminal and the request for the secure financial data; and
    transmitting the secure financial data to the payment delivery terminal through the proximity communications unit following verification of the payment delivery terminal and the request for the secure financial data.

15. The step of transmitting secure financial data as claimed in claim 14, wherein the request for secure financial data comprises a transaction total and where the secure financial data comprises a transaction token valued the same as the transaction total.

* * * * *